May 27, 1952 — H. ALTHAM — 2,598,205
VERMIN TRAP
Filed Aug. 4, 1947
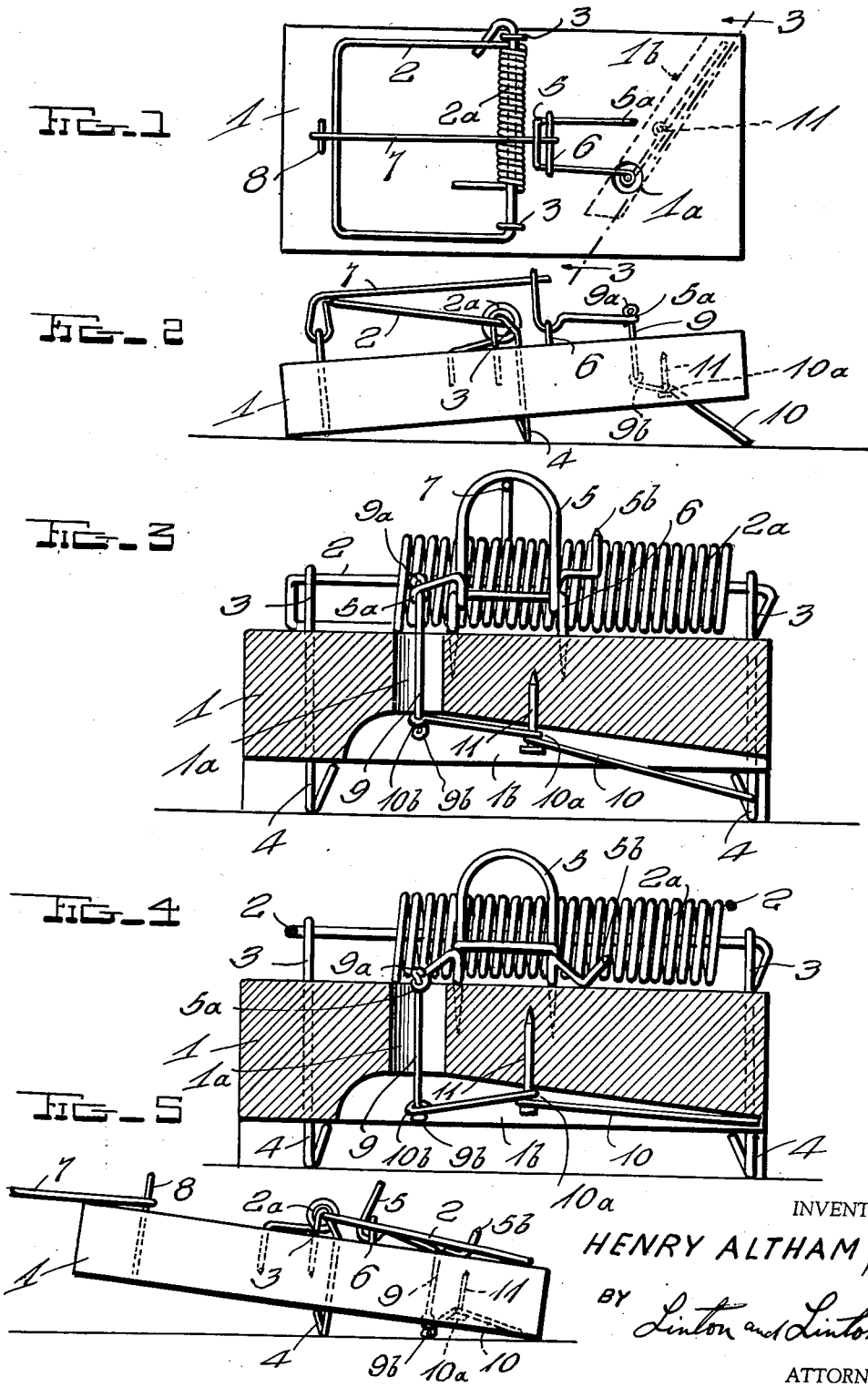
INVENTOR
HENRY ALTHAM,
BY Linton and Linton
ATTORNEYS Patented May 27, 1952

2,598,205

UNITED STATES PATENT OFFICE 2,598,205

VERMIN TRAP

Henry Altham, Wrexham, North Wales

Application August 4, 1947, Serial No. 766,127
In Great Britain October 12, 1945

1 Claim. (Cl. 43—81)

The present invention relates to vermin traps and more particularly to traps for catching mice, rats and the like rodents in which the spring actuated jaw is released under the influence of the weight of the animal mounting the trap and an object of the invention is to generally improve the efficiency of such traps.

Another object of the invention is to provide traps of the aforesaid character with a bait holder which may be readily baited and the spring actuated jaw thereof set without special care, the fine degree of manipulation as heretofore required or the use of a safety catch.

Other objects of the invention will be obvious and pointed out hereinafter as the description continues.

In the accompanying drawings:

Fig. 1 is a plan view of the trap when in set position.

Fig. 2 is a side elevation of the same.

Fig. 3 is a vertical cross-sectional view taken on the line 3—3 of Fig. 1 in the direction of the arrow points when the trap is in set position.

Fig. 4 is a similar view when the trap has been sprung; and

Fig. 5 is a side elevation of the trap after it has been sprung.

I denotes a base member, i. e., a flat piece of wood, whereon is mounted a spring actuated jaw or wire frame 2 pivotally secured to base I by staples 3, and including a coiled spring 2a. Elongations of staples 3 extend through base I and form projections or rockers 4, upon which the complete trap may pivot or rock when resting upon a supporting surface.

A loop-shaped wire bait-holding catch member 5 is loosely pivoted on base I by means of a staple 6, and a wire detent rod 7 pivotally secured at one end of base I by a staple 8 is designed to hold frame 2 in a set position (i. e. when said frame has been revolved against the resistance of spring 2a) by engagement of its free end in the loop of the catch member 5.

A wire rod link 9, whose extremities are looped to provide stops, respectively 9a, 9b, is loosely connected to catch member 5 by means of a loop 5a formed on said catch member, and passes through base I, via passage Ia therein, for association with a wire lever 10 which is freely pivoted in the cut-away portion Ib of base I, by means of a medial loop portion 10a on a pin II. The end of said lever 10 adjacent link 9 is loosely looped at 10b around wire 9 above its lower stop 9b.

The looped extremity 10b of lever 10 is free to slide on the link 9 as also the loop 5a of the catch member and thus there is permitted independent movement of lever 10 relative to the bait holder 5, and the trap may be readily baited and set without special care in the setting i. e. without necessity for a fine degree of manipulation, or the use of a safety catch.

It will be seen that when the trap is set the bait carrying end 5b is tilted upward with lever 10 projecting below the base and extending—as viewed in plan—at an angle to the longitudinal axis of the trap as shown most clearly in Fig. 1, so that if now the weight of an animal tilts the trap in the reverse direction (Fig. 5) the consequential actuation of lever 10 (as in Fig. 4), causes wire 9 to be pulled downward, so pivoting member 5 in its retaining staple 6 and disengaging same from rod 7, thereby allowing the return of frame 2 under the influence of spring 2a, and the trapping of the animal. It is to be noted that the direction of movement of member 5 is away from the pivoting point of detent rod 7.

To set the trap, suitable bait is placed upon the prong 5b of the catch member and the jaw 2 is moved to the position as best shown in Figs. 1 and 2 of the drawings. The free end of the detent rod 7 is then placed under the looped portion of the catch member 5 whereat the jaw 2 is retained in its set position and the base member is then placed upon the floor or other supporting surface. As the animal attacks the bait, his weight will tilt the trap upon the rockers 4 to the position as best shown in Fig. 5 of the drawings whereupon the lever 10 will exert a direct pull upon the link 9 and the latter will in turn rock the catch member 5 until the free end of the detent rod 7 is released. As the rod 7 is released, the jaw 2 will under the influence of the spring 2a be caused to swing from the position shown in Fig. 1 to the position shown in Fig. 5 whereat the animal will be trapped between the jaw 2 and the base I of the trap.

I claim:

A vermin trap comprising in combination a base member, a pair of spaced staples secured to and extending through said base, a spring actuated jaw pivotally connected to said staples, a fulcrum element connected to each staple and extending from the bottom of said base member to render the latter tiltable upon a supporting surface, a bait carrying catch member pivotally connected to the top of said base member, a detent rod pivotally connected to said base member and engageable at times with said bait carrying catch member for retaining said spring actuated jaw in its set position, a wire link extending through an aperture formed within said base, said bait carrying catch member having a loop formed at one end, a wire lever, said base member having a recess formed in the bottom portion thereof and extending diagonally across the same from the aperture formed therein, means for pivotally retaining said lever within the recess of said base member, said wire lever having a loop formed at one end, said wire link extending through loops of the bait carrying catch member and wire lever whereby the latter may freely slide thereupon and said wire link having stops formed on its opposite ends for limiting the sliding movements of said loops.

HENRY ALTHAM.

REFERENCES CITED

The following references are of record in the file of this patent:

UNITED STATES PATENTS

| Number | Name | Date |
| --- | --- | --- |
| 472,687 | Winkler | Apr. 12, 1892 |
| 481,707 | Trumble | Aug. 30, 1892 |
| 553,372 | Waldurff | Jan. 21, 1896 |
| 717,002 | Hooker | Dec. 30, 1902 |
| 871,809 | Marks | Nov. 26, 1907 |
| 1,423,715 | Hedberg | July 25, 1922 |
| 1,429,189 | Chasse | Sept. 12, 1922 |
| 1,549,730 | Biener | Aug. 11, 1925 |
| 1,929,286 | Osborne | Oct. 3, 1933 |
| 1,967,629 | Ruby | July 24, 1934 |
| 2,263,161 | Brust | Nov. 18, 1941 |